(12) United States Patent
Huang

(10) Patent No.: US 7,193,866 B1
(45) Date of Patent: Mar. 20, 2007

(54) HALF-BRIDGE LLC RESONANT CONVERTER WITH A SYNCHRONOUS RECTIFICATION FUNCTION

(76) Inventor: Ming-Ho Huang, No. 25, Wu-Gong 6th Rd., Wu-Ku Industrial Park, Taipei Hsien (TW)

( * ) Notice: Subject to any disclaimer, the term of this patent is extended or adjusted under 35 U.S.C. 154(b) by 0 days.

(21) Appl. No.: 11/493,882

(22) Filed: Jul. 26, 2006

(30) Foreign Application Priority Data

May 9, 2006 (TW) .............................. 95207894 U

(51) Int. Cl.
*H02M 3/335* (2006.01)
(52) U.S. Cl. .......................................... 363/22; 363/23
(58) Field of Classification Search ................ 363/22, 363/23, 18, 19, 98, 132
See application file for complete search history.

(56) References Cited

U.S. PATENT DOCUMENTS 6,009,001 A * 12/1999 Otake .......................... 363/23
6,400,584 B1 * 6/2002 Sabate et al. ................. 363/22
6,917,528 B2 * 7/2005 Abe ............................. 363/22

* cited by examiner

*Primary Examiner*—Bao Q. Vu
(74) *Attorney, Agent, or Firm*—Law Offices of John Chupa & and Associates, P.C.

(57) ABSTRACT

The invention discloses a half-bridge LLC resonant converter with a synchronous rectification function that includes a first switch; a second switch; a first transformer; a first synchronous rectifier; a second synchronous rectifier; a controller; and a second transformer. The controller of the half-bridge LLC resonant converter with a synchronous rectification function can control the first synchronous rectifier and the second synchronous rectifier directly and the connected second transformer also can control the first switch and the second switch directly. The first synchronous rectifier and second synchronous rectifier having a low conducting resistance substitute the rectifier and greatly lower the power consumption. The controller outputs a control signal to drive a transformer to output a signal to the primary winding, and its signal delay is formed by a delay of an electronic circuit and a power MOS switch of the first switch and second switch.

17 Claims, 6 Drawing Sheets

HALF-BRIDGE LLC RESONANT CONVERTER WITH A SYNCHRONOUS RECTIFICATION FUNCTION

BACKGROUND OF THE INVENTION

1. Field of the Invention

The present invention relates to a half-bridge LLC resonant converter with a synchronous rectification function, and more particularly to a controller installed at a secondary winding for directly controlling a first synchronous rectifier and a second synchronous rectifier as well as directly controlling a first switch and a second switch of the half-bridge LLC resonant converter with a synchronous rectification function. In addition, the present invention uses a first synchronous rectifier and a second synchronous rectifier with a low conducting resistance to substitute a general rectifier and also greatly lower the power consumption.

2. Description of the Related Art

As a prior art half-bridge LLC resonant converter with a synchronous rectification function usually sets a controller and a switch at a primary winding and a rectifier at a secondary winding, the controller can directly control the electrical conduction or cutoff of the switch. If it is necessary to use the synchronous rectifier, then a transformer or an optical coupler will be used for connecting a control signal to the secondary winding for the control. However, the foregoing prior art half-bridge LLC resonant converter with a synchronous rectification function has the following shortcomings: 1. When the rectifier is conducted electrically, the rectifier consumes much power; 2. The controller cannot control the synchronous rectifier directly; 3. The MOS switch and the rectifier are conducted electrically with each other, and thus it cannot achieve a precise control and the whole circuit may be damaged easily.

In view of the foregoing shortcomings, we need a half-bridge LLC resonant converter with a synchronous rectification function that sets the controller at a secondary winding. Besides controlling the first synchronous rectifier and the second synchronous rectifier directly, the half-bridge LLC resonant converter also can control the half-bridge LLC resonant converter with a synchronous rectification function of the first switch and the second switch directly. Further, the present invention uses the first synchronous rectifier and the second synchronous rectifier with a low conducting resistance to substitute a general rectifier and greatly lower the power consumption, so as to overcome the shortcomings of the prior art half-bridge LLC resonant converter with a synchronous rectification function.

SUMMARY OF THE INVENTION

Therefore, it is a primary objective of the present invention to provide a feasible solution and overcome the foregoing problems by providing a half-bridge LLC resonant converter with a synchronous rectification function that sets its controller at a secondary winding. Besides controlling the first synchronous rectifier and the second synchronous rectifier directly, the half-bridge LLC resonant converter also can control the half-bridge LLC resonant converter with a synchronous rectification function of the first switch and the second switch directly.

Another objective of the present invention is to provide a half-bridge LLC resonant converter with a synchronous rectification function that uses a power switch with a low conducting resistance to substitute the rectifier, so as to greatly reduce the power consumption.

To achieve the foregoing objectives, the half-bridge LLC resonant converter with a synchronous rectification function in accordance with the invention comprises: a first switch, being a three-terminal component, with its first terminal coupled to a power input terminal; a second switch, being a three-terminal component, with its third terminal coupled to another power input terminal, and its first terminal coupled to a third terminal of the first switch; a LLC resonant circuit, with a terminal coupled to the first switch, and another terminal coupled to a first transformer; a first transformer, having an elementary coil, a primary coil and a secondary coil, and the elementary coil being coupled to the LLC resonant circuit; a first synchronous rectifier, coupled to the primary coil; a second synchronous rectifier, coupled to the secondary coil; a controller, with its input terminal coupled to another terminal of the primary coil, and its output terminal coupled separately to the first synchronous rectifier and a second terminal of the second synchronous rectifier; and a second transformer, with both terminals of its elementary coil coupled to the output terminal of the controller and both terminals of its primary coil coupled separately to a second terminal and a third terminal of the first switch, and its secondary coil coupled separately to a second terminal and a third terminal of the second switch; such that the controller can control the first synchronous rectifier and the second synchronous rectifier directly, and also can control the first switch and the second switch through the connection with the second transformer directly.

To make it easier for our examiner to understand the structure, characteristics and objectives of the present invention, we use a preferred embodiment together with the attached drawings for the detailed description of the invention.

DETAILED DESCRIPTION OF THE PREFERRED EMBODIMENTS

Figure 1:
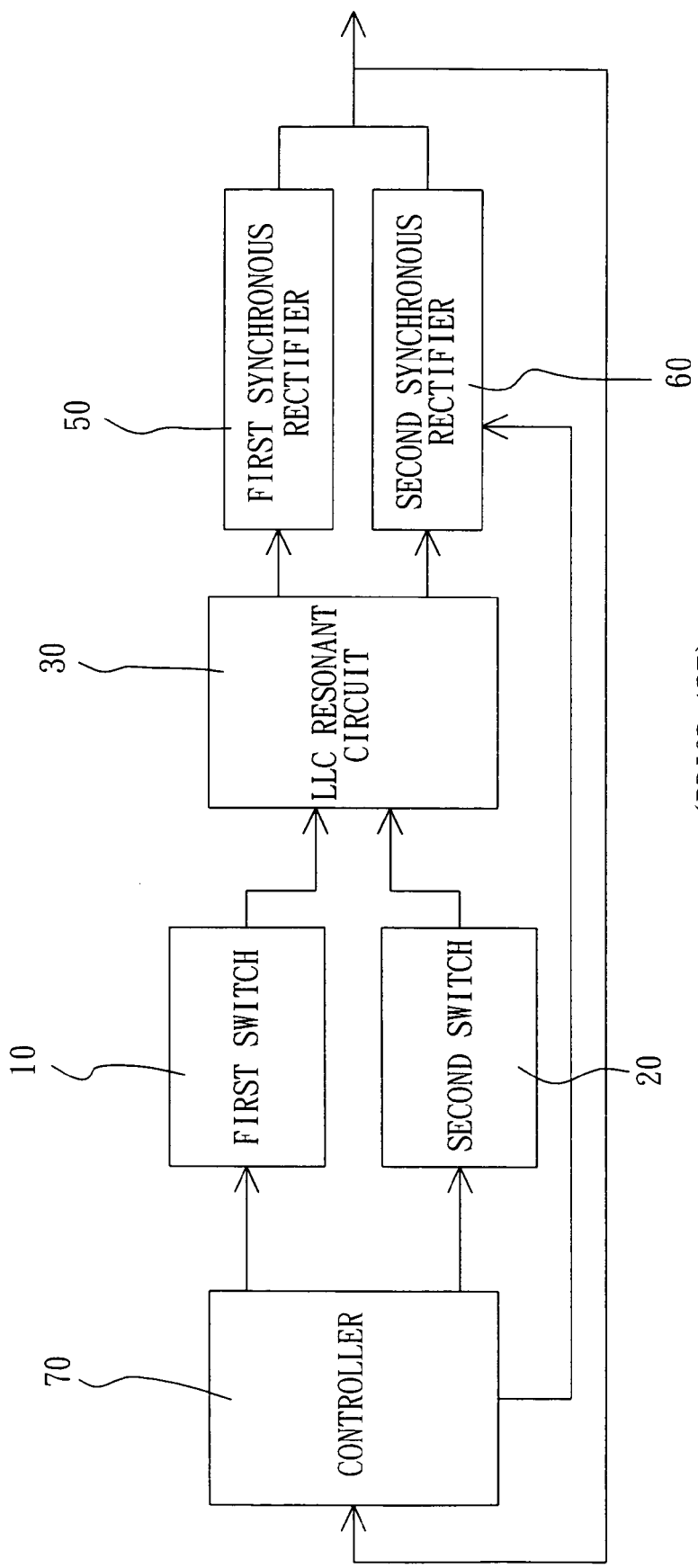
FIG. 1 is a schematic block diagram of a half-bridge LLC resonant converter with a synchronous rectification function according to a preferred embodiment of the present invention.
Figure 2A:
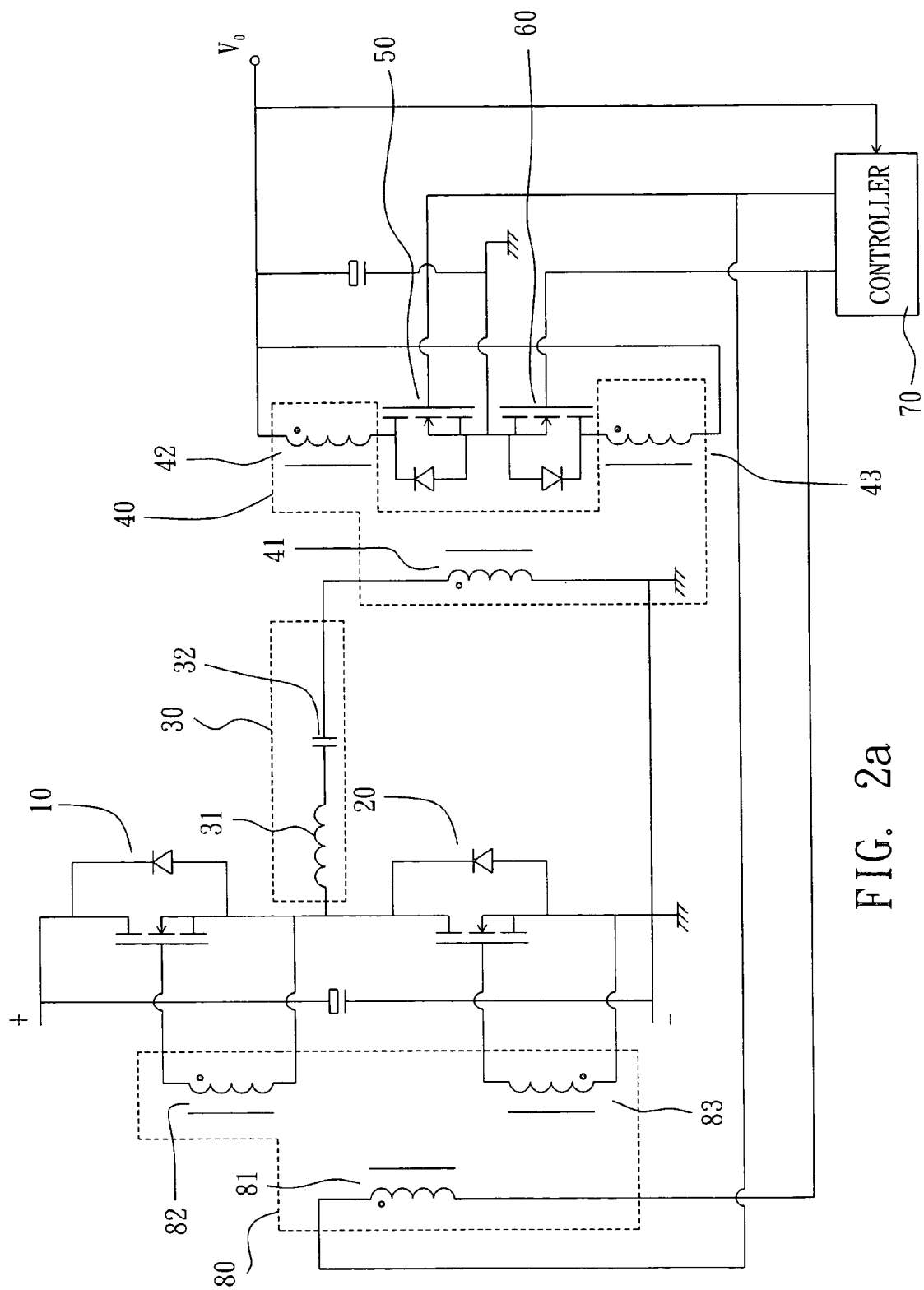
FIGS. 2a to 2d are schematic circuit diagrams of a half-bridge LLC resonant converter with a synchronous rectification function according to a preferred embodiment of the present invention.
Figure 2B:
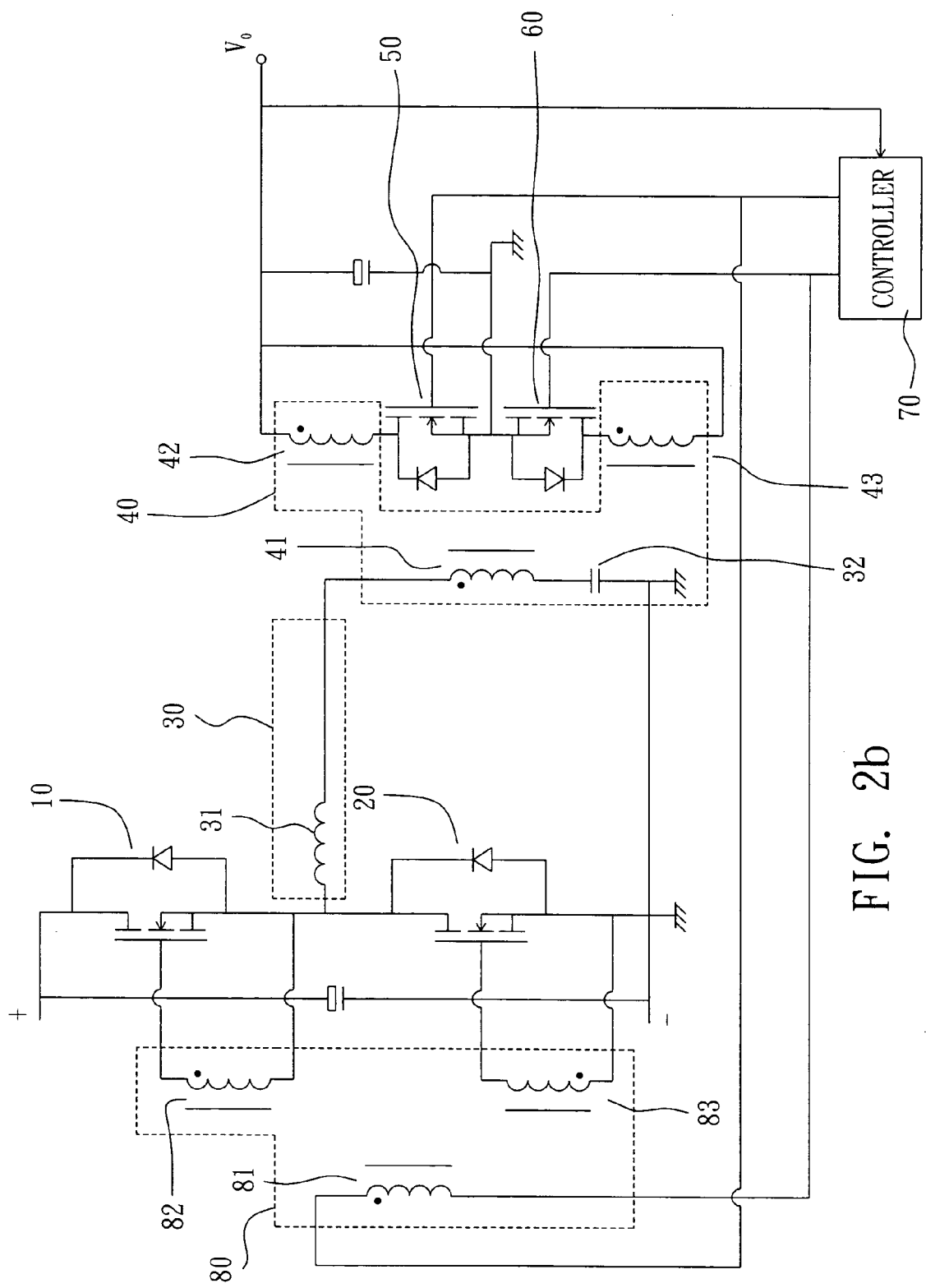
Figure 2C:
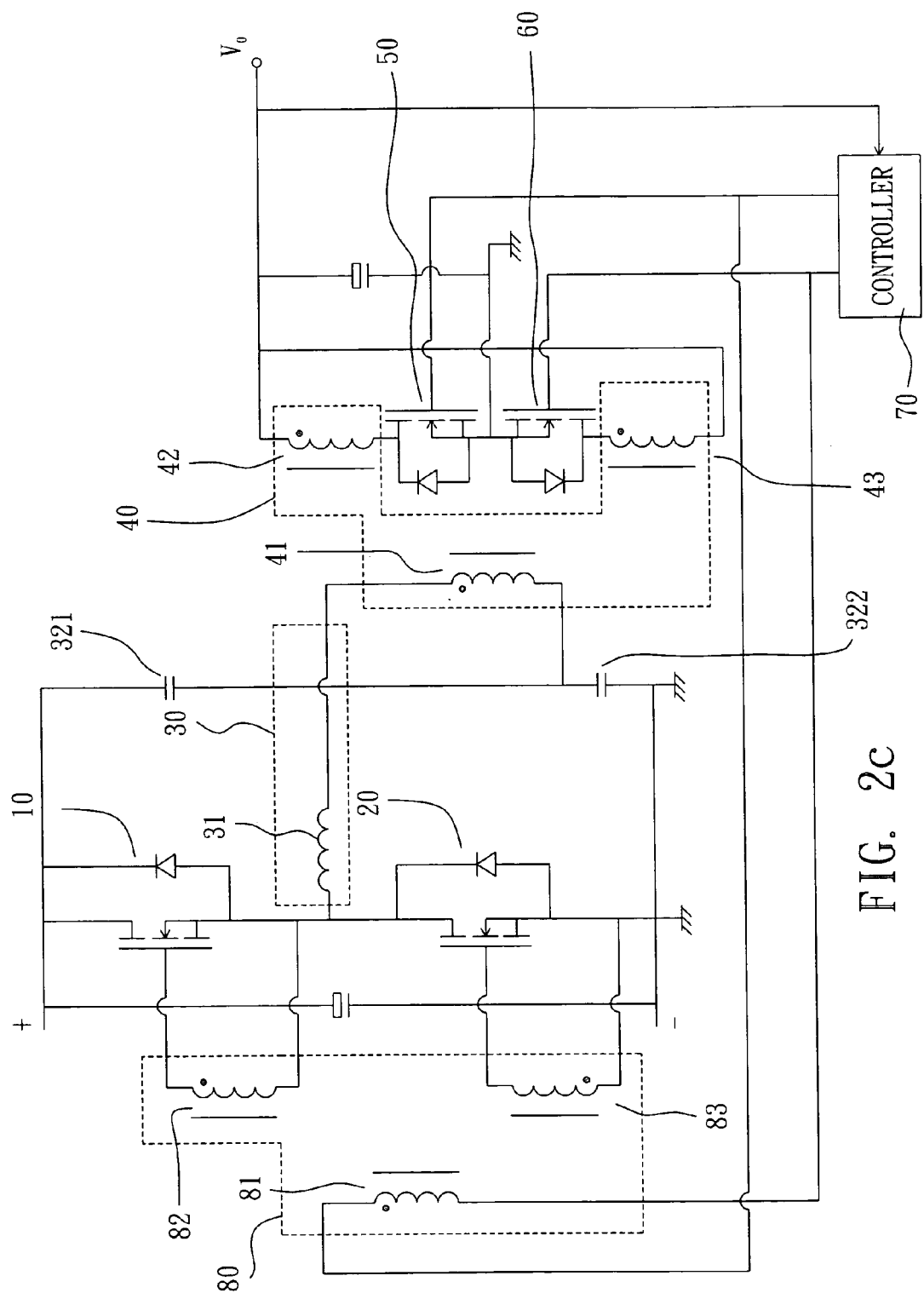
Figure 2D:
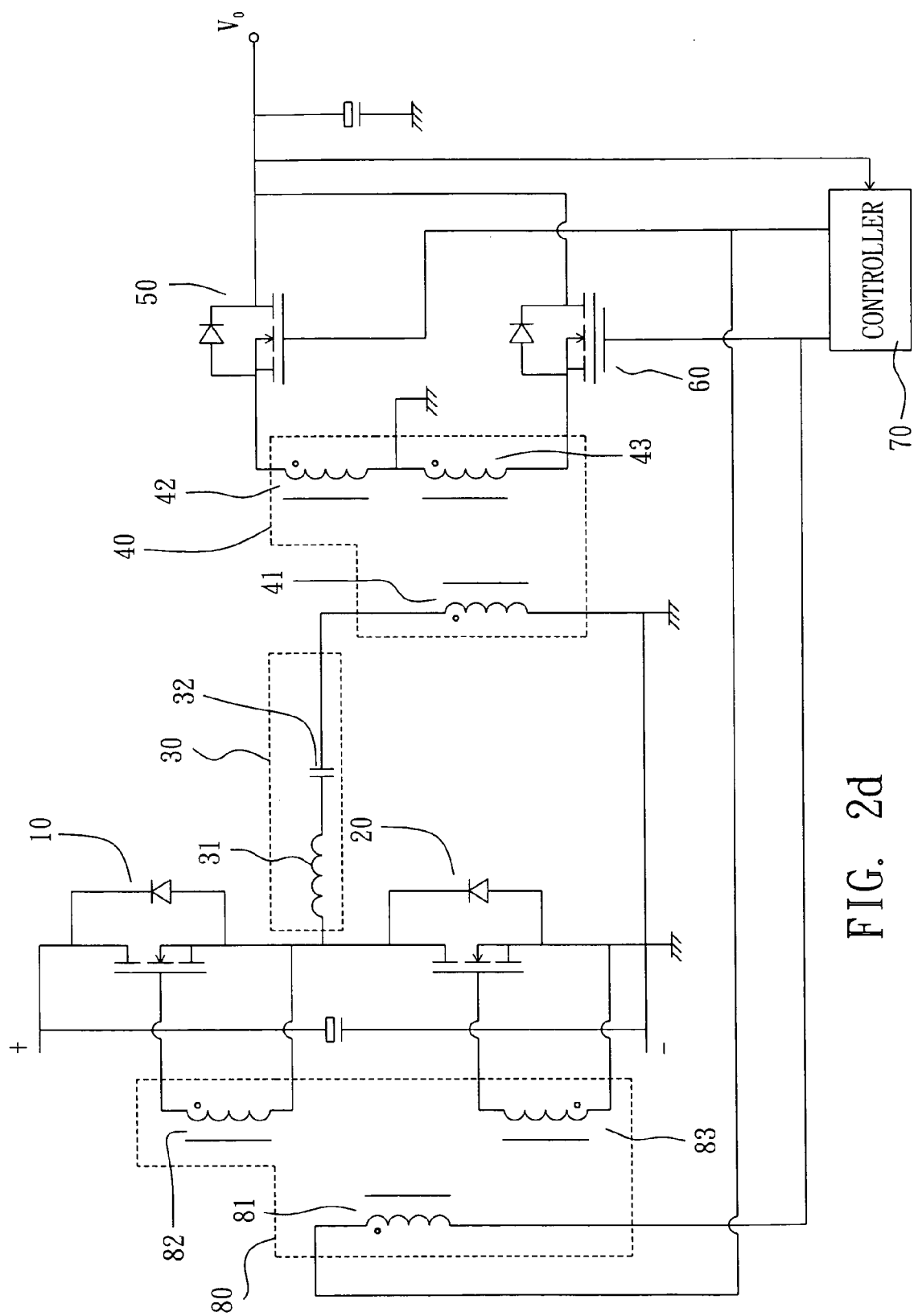

Referring to FIGS. 1 and 2a to 2d for a schematic block diagram and schematic circuit diagrams of a half-bridge LLC resonant converter with a synchronous rectification function in accordance with a preferred embodiment of the present invention, the half-bridge LLC resonant converter with a synchronous rectification function comprises: a first switch 10; a second switch 20; a LLC resonant circuit 30; a first transformer 40; a first synchronous rectifier 50; a second synchronous rectifier 60; a controller 70; and a second transformer 80.

The first switch 10 is a three-terminal component, which could be a power switch including but not limited to a N-channel metal oxide semiconductor field effect transistor (MOSFET), a N-channel junction field effect transistor (JFET), a P-channel metal oxide semiconductor field effect transistor (MOSFET) or a P-channel junction field effect transistor (JFET), and it is hereinafter referred to as a first MOS switch 10 having a low conducting resistance including but not limited to 10 mΩ, and its first terminal is coupled to a power input terminal (+power input terminal), and its second terminal and third terminal are coupled to both terminals of the second transformer 80 (refer to the description of the second transformer 80) for receiving the control of the controller 70 to be turned on or cut off. The first terminal is a drain of the first MOS switch 10, and the second terminal is a gate of the first MOS switch 10, and the third terminal is a source of the first MOS switch 10.

The second switch 20 is also a three-terminal component, which could be a power switch including but not limited to a N-channel metal oxide semiconductor field effect transistor (MOSFET), a N-channel junction field effect transistor (JFET), a P-channel metal oxide semiconductor field effect transistor (MOSFET) or a P-channel junction field effect transistor (JFET), and it is hereinafter referred to as a second MOS switch 20 having a low conducting resistance including but not limited to 10 mΩ, and its third terminal is coupled to a power supply and another input terminal (a negative power input terminal), and its first terminal is coupled to another terminal of the elementary coil 31 of the first transformer 40, and its second terminal is coupled to the second transformer 80 for receiving the control of the controller 70 to be turned on or cut off. The first terminal is a drain of the second MOS switch 20, and the second terminal is a gate of the second MOS switch 20, and the third terminal is a source of the second MOS switch 20.

The LLC resonant circuit 30 further comprises an inductor 31 and a capacitor 32, and the inductor 31 could be a leakage inductance or a physical inductor of the elementary coil 41 of the first transformer 40 as shown in FIGS. 2(*a*) to 2(*d*). The inductor 31 is used for a physical inductor as an example. If the inductor 31 is a leakage inductance of the elementary coil 41, the inductor 31 will not be drawn in FIGS. 2(*a*) to 2(*d*). A terminal of the inductor 31 is coupled to a third terminal of the first switch 10, and a terminal of the capacitor 32 is coupled to another terminal of the inductor 31, and another terminal of the capacitor 32 is coupled to an elementary coil 41 of the first transformer 40.

In FIG. 2(*b*), a terminal of the inductor 31 is coupled to a third terminal of the first switch 10, and another terminal of the inductor 31 is coupled to an elementary coil 41 of the first transformer 40, and a terminal of the capacitor 32 is coupled to another terminal of the elementary coil 41, and another terminal of the capacitor 32 is grounded.

In FIG. 2(*c*), a terminal of the inductor 31 is coupled to a third terminal of the first switch 10, and another terminal of the inductor 31 is coupled to an elementary coil 41 of the first transformer 40. The capacitor 32 further comprises a first capacitor 321 and a second capacitor 322, wherein a terminal of the first capacitor 321 is coupled to a positive power supply $V_{cc}$, and another terminal is coupled to the second capacitor 322 and another terminal of the elementary coil 41, and a terminal of the second capacitor 322 is coupled to another terminal of the first capacitor 321, and another terminal of the second capacitor 322 is grounded.

The first transformer 40 including but not limited to a power transformer has an elementary coil 41, a primary coil 42 and a secondary coil 43, wherein both terminals of the elementary coil 41 are coupled to the LLC resonant circuit 30, so that the DC input voltage is coupled to the primary coil 42 and the secondary coil 43.

The first synchronous rectifier (SR) 50 could be any power switch including but not limited to a N-channel metal oxide semiconductor field effect transistor (MOSFET), a N-channel junction field effect transistor (JFET), a P-channel metal oxide semiconductor field effect transistor (MOSFET) or a P-channel junction field effect transistor (JFET) having a low conducting resistance including but not limited to 10 mΩ, and its first terminal is coupled to a terminal of the first transformer secondary coil 42 and its second terminal is coupled to the output terminal of the controller 70, and its third terminal is coupled to a third terminal of the second synchronous rectifier 60, and another terminal of the primary coil 42 is coupled to the input terminal and the output voltage $V_O$ of the controller 70, and its gate can accept the control of the controller 70 to output the DC power induced by the primary coil 42. The first terminal is a drain of the first synchronous rectifier 50, and the second terminal is a gate of the first synchronous rectifier 50, and the third terminal is a source of the first synchronous rectifier 50.

The second synchronous rectifier (SR) 60 could be any power switch including but not limited to a N-channel metal oxide semiconductor field effect transistor (MOSFET), a N-channel junction field effect transistor (JFET), a P-channel metal oxide semiconductor field effect transistor (MOSFET) or a P-channel junction field effect transistor (JFET) having a low conducting resistance including but not limited to 10 mΩ, and its first terminal is coupled to another terminal of the secondary coil 43, and its second terminal is coupled to another output terminal of the controller 70, and its third terminal is coupled to a third terminal of the first synchronous rectifier 40, and another terminal of the secondary coil 43 is coupled to the input terminal and the output voltage $V_O$ of the controller 70, and its gate can accept the control of the controller 70 to output the DC power induced by the secondary coil 43, wherein the first terminal is a drain of the second synchronous rectifier 60, and the second terminal is a gate of the second synchronous rectifier 60, and the third terminal is a source of the second synchronous rectifier 60.

Further, the first synchronous rectifier 50 and the second synchronous rectifier 60 can be connected as shown in FIG. 2(*d*), wherein a first terminal of the first synchronous rectifier 50 is coupled to a terminal of the secondary coil 42 of the first transformer 40, and its second terminal is coupled to an output terminal of the controller 70, and its third terminal is coupled to an input terminal and an output voltage $V_O$ of the controller 70. A terminal of the second synchronous rectifier 60 is coupled to another terminal of the secondary coil 42, and its second terminal is coupled to another output terminal of the controller 70, and its third terminal is coupled to an input terminal and an output voltage $V_O$ of the controller 70.

The controller 70 is set at a secondary winding and coupled to the first synchronous rectifier 50, the second synchronous rectifier 60 and the output voltage $V_O$, and the controller is an oscillation controller for adjusting its output frequency to the output frequency of the first MOS switch 10, the second switch 20, the first synchronous rectifier 50 and the second synchronous rectifier 60 based on the output voltage $V_O$, wherein the controller 70 outputs a set of differential signals to the gates of the first synchronous rectifier 50 and the second synchronous rectifier 60.

The second transformer 80 including but not limited to a drive transformer having an elementary coil 81, a primary coil 82 and a secondary coil 83, wherein the primary coil 82 and the secondary coil 83 have opposite polarities. Both terminals of the elementary coil 81 are coupled to an output terminal of the controller 70 for receiving the differential signals and output opposite phased control signals to the first MOS switch 10 and the second switch 20. A terminal of the primary coil 82 is coupled to a gate of the first MOS switch 10, and another terminal is coupled to its third terminal, and its secondary coil 83 is coupled to a gate of the second switch 20, and another terminal is coupled to a DC power input terminal, and the second switch 20 can accept the control of a positive phased control signal for the electric conduction, and the second switch 20 can accept the control of an opposite phased control signal for an electric conduction. Therefore, the controller 70 can be controlled to turn on or cut off the first MOS switch 10. After a first delay time, the first synchronous rectifier 50 can be turned on or cut off. After a second delay time, the second MOS switch 20 can be cut off or turned on, and the second synchronous rectifier 60 can be cut off or turned on accordingly, wherein the first delay time and the second delay time can be changed according to the requirements of the design.

During the operation of the foregoing half-bridge LLC resonant converter with a synchronous rectification function, its controller 70 can control the first synchronous rectifier 50 and the second synchronous rectifier 60 directly, and the connection of the second transformer 80 controls the first MOS switch 10 and the second MOS switch 20, such that the first MOS switch 10 can be turned on or cut off. After a first delay time, the first synchronous rectifier 50 is turned on or cut off accordingly. After the second MOS switch 20 is cut off or turned on for a second delay time, the second synchronous rectifier 60 is cut off or turned on accordingly.

Since the present invention uses a first synchronous rectifier 50 and a second synchronous rectifier 60 having a low conducting resistance to substitute a general rectifier and greatly lower the power consumption. The foregoing first synchronous rectifier 50 and second synchronous rectifier 60 have 10 mΩ conducting resistors. Assumed that the rectifier has a 0.5V conducting voltage, its output current is 10 A, such that when the half-bridge LLC resonant converter with a synchronous rectification function is conducted electrically, the power consumption of the first synchronous rectifier 50 or the second synchronous rectifier 60 is equal to $I_o^2 \times R_{DS\ (on)} = 10^2 \times 10 \times 10^{-3} = 1$ W. When the prior art half-bridge LLC resonant converter is conducted electrically, the power consumption of the rectifier is equal to $I_o \times V_f = 10 \times 0.5 = 5$ W. The power consumption of the first synchronous rectifier 50 or the second synchronous rectifier 60 is only ⅕ of the power consumption of the rectifier of the prior art half-bridge LLC resonant converter, and thus it shows that the present invention improves over the prior art half-bridge LLC resonant converter with a synchronous rectification function.

Figure 3:
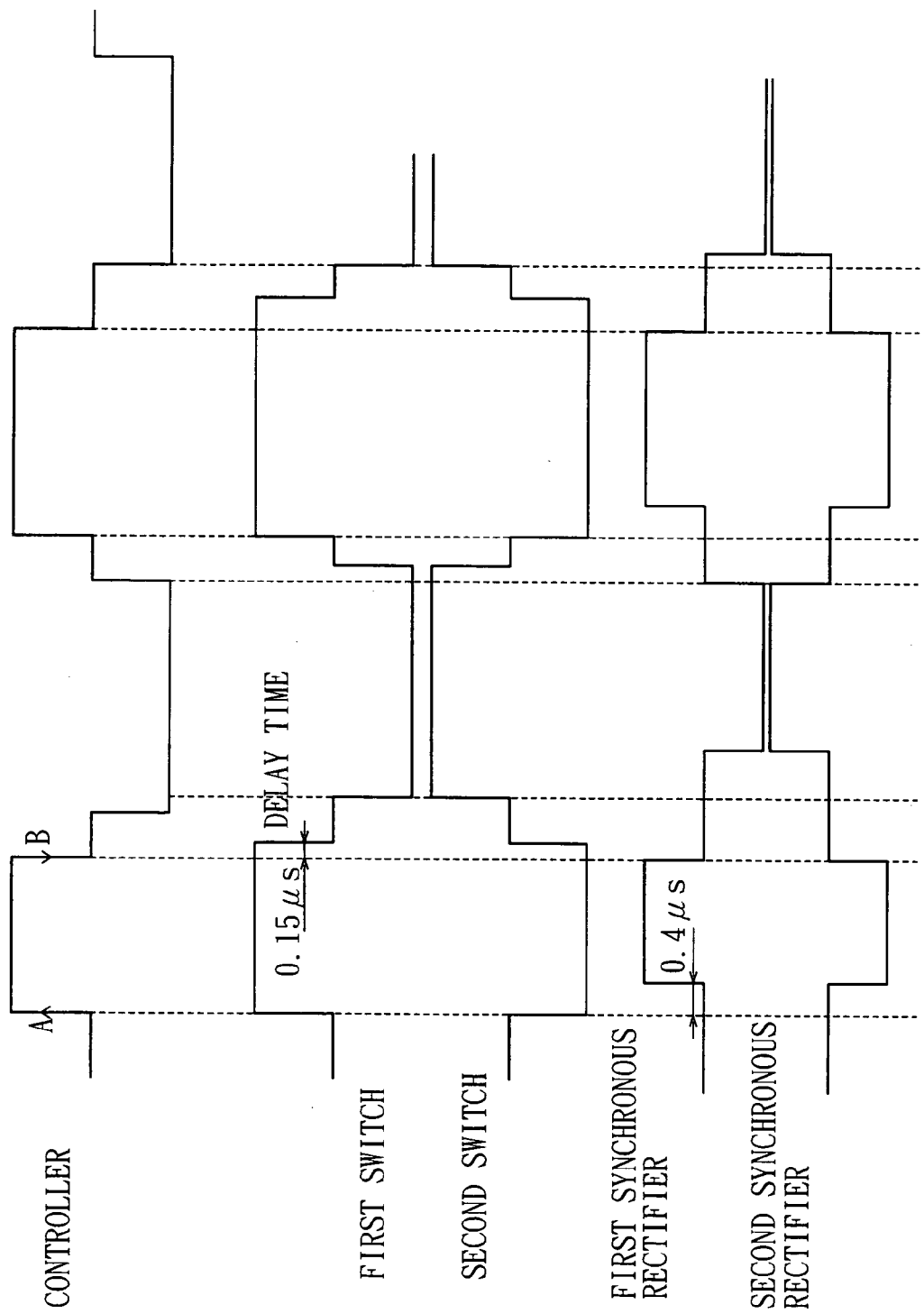
FIG. 3 is a schematic view of a controller controlling the electric connection of a first MOS switch, a second MOS switch, a first synchronous rectifier and a second synchronous rectifier according to a preferred embodiment of the present invention.

Referring to FIG. 3 for a schematic view of a controller 70 controlling the electric conduction of a first MOS switch 10, a second MOS switch 20, a first synchronous rectifier 50 and a second synchronous rectifier 60 according to a preferred embodiment of the present invention, the controller 70 sends out a signal changing its low potential to high potential to the first MOS switch 10, the second MOS switch 20, the first synchronous rectifier 50 and the second synchronous rectifier 60 at Point A of FIG. 3. The first MOS switch 10 is conducted electrically and the first synchronous rectifier 50 will be conducted electrically after a delay including but not limited to 0.4 micro second. This signal delay is formed by the delay of a power MOS switch of the first synchronous rectifier 50, and the second MOS switch 20 and the second synchronous rectifier 60 are cut off and an opposite phased signal of the first MOS switch 10 and the first synchronous rectifier 50 are outputted.

At Point B in the figure, the controller 70 sends out a signal changing from a high potential to a low potential to the first MOS switch 10, the second MOS switch 20, the first synchronous rectifier 50 and the second synchronous rectifier 60. The first synchronous rectifier 50 is cut off immediately, and the first MOS switch 10 is cut off after a delay including but not limited to 0.15 micro second, and the second synchronous rectifier 60 will be conducted electrically at once, and the second MOS switch 20 is conducted electrically after a delay including but not limited to 0.15 micro second, wherein the signal delay of 0.15 micro second is formed by the electric circuit of the first MOS switch 10 and the second MOS switch 20 and a delay of the power MOS switch and can be changed according to the requirements of the design. Between Points A and B, the first MOS switch 10 and the first synchronous rectifier 50 or the second MOS switch 20 and the second synchronous rectifier 60 are electrically conducted or cut off at the same time. Therefore, the present invention can overcome the shortcomings of the MOS switch and the rectifier of the prior art half-bridge LLC resonant converter with a synchronous rectification function being conducted electrically with each other.

In the preferred embodiment of the present invention, the controller is set at a secondary winding and thus it can control the first synchronous rectifier and also can control the half-bridge LLC resonant converter with a synchronous rectification function of the first switch and the second switch directly. Further the present invention uses the first synchronous rectifier and the second synchronous rectifier having a low conducting resistance to substitute the rectifier and lower the power consumption, so as to overcome the shortcomings of the prior art half-bridge LLC resonant converter with a synchronous rectification function.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A half-bridge LLC resonant converter with a synchronous rectification function, comprising:
    a first switch, being a three-terminal component, with its first terminal coupled to a power input terminal;
    a second switch, being a three-terminal component, with its third terminal coupled to another power input terminal, and its first terminal coupled to a third terminal of said first switch;
    a LLC resonant circuit, with a terminal coupled to first switch, and another terminal coupled to another power input terminal;
    a first transformer, having an elementary coil, a primary coil and a secondary coil, and said elementary coil being coupled to said LLC resonant circuit;
    a first synchronous rectifier, coupled to said primary coil;
    a second synchronous rectifier, coupled to said secondary coil;
    a controller, with its input terminal coupled to another terminal of said primary coil, and its output terminal coupled separately to said first synchronous rectifier and a second terminal of said second synchronous rectifier; and
    a second transformer, with both terminals of its elementary coil coupled to said output terminal of said controller and both terminals of its primary coil coupled separately to a second terminal and a third terminal of said first switch, and its secondary coil coupled separately to a second terminal and a third terminal of said second switch;

such that said controller can control said first synchronous rectifier and said second synchronous rectifier directly, and also can control said first switch and said second switch through the connection with said second transformer directly.

2. The half-bridge LLC resonant converter with a synchronous rectification function of claim 1, wherein said first switch and said second switch are set at a primary winding; said first synchronous rectifier and said second synchronous rectifier are set at a secondary winding, and both are power switches with a low conducting resistance.

3. The half-bridge LLC resonant converter with a synchronous rectification function of claim 2, wherein said power switch is a metal oxide semiconductor field effect transistor (MOSFET), a N-channel junction field effect transistor (JFET), a P-channel metal oxide semiconductor field effect transistor (MOSFET) or a P-channel junction field effect transistor (JFET).

4. The half-bridge LLC resonant converter with a synchronous rectification function of claim 3, wherein said first terminal is a drain of said field effect transistor, and said second terminal is a gate of said field effect transistor, and said third terminal is a source of said field effect transistor.

5. The half-bridge LLC resonant converter with a synchronous rectification function of claim 1, wherein said first transformer is set at said primary winding and said first transformer is a power transformer.

6. The half-bridge LLC resonant converter with a synchronous rectification function of claim 1, wherein said second transformer is set at said secondary winding, and said second transformer is a drive transformer.

7. The half-bridge LLC resonant converter with a synchronous rectification function of claim 1, wherein said controller is set at a secondary winding, and said controller is an oscillation controller capable of adjusting its output to an output frequency of said first switch, said second switch, said first synchronous rectifier and said second synchronous rectifier according to output voltages of said first synchronous rectifier and said second synchronous rectifier.

8. The half-bridge LLC resonant converter with a synchronous rectification function of claim 1, wherein said first switch has been conducted electrically for a first delay time before said first synchronous rectifier is conducted electrically.

9. The half-bridge LLC resonant converter with a synchronous rectification function of claim 8, wherein said first synchronous rectifier is cut off after said first switch has been cut off for a second delay time.

10. The half-bridge LLC resonant converter with a synchronous rectification function of claim 1, wherein said LLC resonant circuit further comprises an inductor and a capacitor.

11. The half-bridge LLC resonant converter with a synchronous rectification function of claim 10, wherein said inductor is a leakage inductance or a physical inductor of said elementary coil of said first transformer.

12. The half-bridge LLC resonant converter with a synchronous rectification function of claim 11, wherein said inductor has a terminal coupled to a third terminal of said first switch and another terminal coupled to said elementary coil, and a terminal of said first capacitor is coupled to said power input terminal and another terminal is coupled to said second capacitor and another terminal of said elementary coil, and a terminal of said second capacitor is coupled to another terminal of said first capacitor, and said other terminal is grounded.

13. The half-bridge LLC resonant converter with a synchronous rectification function of claim 11, wherein said inductor has a terminal coupled to a third terminal of said first switch and another terminal coupled to an elementary coil of said first transformer, and a terminal of said capacitor is coupled to another terminal of said elementary coil and another terminal of said capacitor is grounded.

14. The half-bridge LLC resonant converter with a synchronous rectification function of claim 11, wherein said inductor has a terminal coupled to a third terminal of said first switch and another terminal coupled to an elementary coil of said first transformer, and said capacitor further comprises a first capacitor and a second capacitor, and a terminal of said first capacitor is coupled to a positive power supply and another terminal of said first capacitor is coupled to said elementary coil, and another terminal of said elementary coil coupled to said second capacitor is grounded.

15. The half-bridge LLC resonant converter with a synchronous rectification function of claim 1, wherein said primary coil and said secondary coil of said second transformer have opposite polarities.

16. The half-bridge LLC resonant converter with a synchronous rectification function of claim 1, wherein said first synchronous rectifier has a first terminal coupled to a terminal of said first transformer secondary coil, a second terminal coupled to an output terminal of said controller, and a third terminal coupled to an input terminal and an output voltage of said controller, and said second synchronous rectifier has a terminal coupled to another terminal of said secondary coil, a second terminal coupled to another output terminal of said controller, and a third terminal coupled to an input terminal and an output voltage of said controller.

17. The half-bridge LLC resonant converter with a synchronous rectification function of claim 1, wherein said first synchronous rectifier has a first terminal coupled to a terminal of said first transformer secondary coil, a second terminal coupled to an output terminal of said controller, and a third terminal coupled to a third terminal of said second synchronous rectifier, and said second synchronous rectifier has a first terminal coupled to another terminal of said secondary coil and a second terminal coupled to another output terminal of said controller, and another terminal of said secondary coil is coupled to an input terminal and an output voltage of said controller.

* * * * *